US009959347B2

(12) United States Patent
Shen et al.

(10) Patent No.: US 9,959,347 B2
(45) Date of Patent: May 1, 2018

(54) MULTI-LAYER SEARCH-ENGINE INDEX

(71) Applicant: MICROSOFT TECHNOLOGY LICENSING, LLC, Redmond, WA (US)

(72) Inventors: Hui Shen, Beijing (CN); Mao Yang, Beijing (CN); Lintao Zhang, Beijing (CN); Zhenyu Zhao, Beijing (CN); Xiao Wu, Beijing (CN); Ying Yan, Beijing (CN); Xiaosong Yang, Beijing (CN); Chad Walters, Bellevue, WA (US); Choong Soon Chang, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 554 days.

(21) Appl. No.: 14/623,022

(22) Filed: Feb. 16, 2015

(65) Prior Publication Data

US 2015/0161265 A1 Jun. 11, 2015

Related U.S. Application Data

(62) Division of application No. 13/428,709, filed on Mar. 23, 2012, now Pat. No. 8,959,077.

(30) Foreign Application Priority Data

Mar. 24, 2011 (WO) ................ PCT/CN2011/072092

(51) Int. Cl.
*G06F 17/30* (2006.01)
(52) U.S. Cl.
CPC .. *G06F 17/30864* (2013.01); *G06F 17/30312* (2013.01)

(58) Field of Classification Search
CPC ............... G06F 17/30864; G06F 17/30312
See application file for complete search history.

(56) References Cited

U.S. PATENT DOCUMENTS 5,544,352 A * 8/1996 Egger ............... G06F 17/30321
707/999.005
5,701,469 A 12/1997 Brandli et al.
(Continued)

FOREIGN PATENT DOCUMENTS

| TW | 200602869 A | 1/2006 |
|----|-------------|--------|
| TW | I274264 B | 2/2007 |
| TW | 200731136 A | 8/2007 |

OTHER PUBLICATIONS

"Office Action dated Oct. 12, 2015 with Search Report dated Oct. 5, 2015, issued in Taiwan Patent Application No. 101110414", 8 Pages.
Non-Final Office Action dated Dec. 5, 2013 in U.S. Appl. No. 13/428,709, 16 pages.

(Continued)

*Primary Examiner* — Tyler Torgrimson
(74) *Attorney, Agent, or Firm* — Shook, Hardy & Bacon, L.L.P.

(57) ABSTRACT

Subject matter described herein includes a multi-layer search-engine index. Accordingly, the search-engine index is divided into multiple indexes, each of which includes a respective set of information used to serve (i.e., respond to) a query. One index includes a term index, which organizes a set of terms that are found among a collection of documents. Another index includes a document index, which organizes a set of documents that are searchable. A computing device is used to serve the search-engine index (i.e., to analyze the index when identifying documents relevant to a search query). For example, a solid-state device might be used to serve the multi-layer search-engine index.

20 Claims, 5 Drawing Sheets

(56) References Cited

U.S. PATENT DOCUMENTS

| | | | |
|---|---|---|---|
| 6,154,737 | A | 11/2000 | Inaba et al. |
| 7,630,963 | B2 | 12/2009 | Larimore et al. |
| 2001/0007987 | A1 | 7/2001 | Igata |
| 2005/0144160 | A1 | 6/2005 | Doerre et al. |
| 2005/0198076 | A1 | 9/2005 | Stata et al. |
| 2006/0036580 | A1 | 2/2006 | Stata et al. |
| 2008/0059420 | A1 | 3/2008 | Hsu et al. |
| 2008/0091666 | A1 | 4/2008 | Baader et al. |
| 2008/0140639 | A1 | 6/2008 | Doerre et al. |
| 2010/0145918 | A1 | 6/2010 | Stata et al. |
| 2010/0161617 | A1 | 6/2010 | Cao et al. |
| 2010/0223421 | A1 | 9/2010 | Kim et al. |
| 2010/0306288 | A1 | 12/2010 | Stein et al. |
| 2010/0332846 | A1 | 12/2010 | Bowden et al. |
| 2011/0040762 | A1 | 2/2011 | Flatland et al. |

OTHER PUBLICATIONS

Notice of Allowance dated Oct. 8, 2014 in U.S. Appl. No. 13/428,709, 20 pages.

Dean et al., "MapReduce: Simplified Data Processing on Large Clusters", In proceeding of Magazine on Communications of the ACM, 50th anniversary issue: 1958-2008, vol. 51, Issue 1, Jan. 2008, pp. 13.

Martins et al., "Indexing and Ranking in GeoIR Systems", In ACM Workshop on Geographical Information Retrieval, Nov. 4, 2005, pp. 13.

Liu et al., "Digging for Gold on the Web: Experience with the WebGather", In proceeding of The Fourth International Conference on High Performance Computing in the Asia-Pacific Region, May 14-17, 2000, pp. 5.

Yuwono et al., "Search and Ranking Algorithms for Locating Resources on the World Wide Web", In Proceedings of the 12th International Conference on Data Engineering, 1996, pp. 8.

\* cited by examiner

MULTI-LAYER SEARCH-ENGINE INDEX

CROSS-REFERENCE TO RELATED APPLICATIONS

This application is a divisional application of U.S. Ser. No. 13/428,709 (filed on Mar. 23, 2012, and to be issued as U.S. Pat. No. 8,959,077), which claims priority to, and the benefit of, PCT/CN2011/072092 (filed Mar. 24, 2011).

BACKGROUND

A strategy for locating documents (e.g., web pages), which are made available over a network (e.g., Internet), includes submitting a search query to a search engine. Some networks include a vast number of documents, such that searching each individual document in response to a search query is not feasible. Accordingly, search engines often include an index of information, which is organized in a manner to enable the search engine to identify documents that might be relevant to the search query. When responding to a search query, analyzing the index can be a cost-consuming service (i.e., can require relatively high amounts of computing resources).

Costs associated with processing information in a search-engine index can depend on various factors. For example, a structure of the index, as well as an amount of information included in the index, can affects costs. In addition, the computing components that are used to analyze the index can affect costs.

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, a search-engine index that is leveraged to serve search queries.

Subject matter described herein includes a multi-layer search-engine index. For example, one part of the search-engine index includes a term index, and another part of the search-engine index includes a document index. The term index and the document index might be served using various computing components, such as a solid-state drive.

BRIEF DESCRIPTION OF THE DRAWINGS

Illustrative embodiments of the present invention are described in detail below with reference to the attached drawing figures, wherein.

DETAILED DESCRIPTION

The subject matter of select embodiments of the present invention is described with specificity herein to meet statutory requirements. But the description itself is not intended to define what is regarded as the claimed invention; rather, that is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

As indicated, subject matter described herein includes a multi-layer search-engine index. Accordingly, the search-engine index is divided into multiple indexes, each of which includes a respective set of information used to serve (i.e., respond to) a query. One index includes a term index, which organizes a set of terms that are found among a collection of documents. For example, if 100 documents are available to be searched, a term index organizes each searchable term found among the content of each document. Another index includes a document index, which organizes a set of documents that are searchable. Continuing with the example already given, if 100 documents are available to be searched, a document index might include 100 sets of document-specific information, each set of which describes a respective document. A computing device is used to serve the search-engine index (i.e., to analyze the index when identifying documents relevant to a search query). Accordingly, an exemplary computing device will now be described.

Figure 1:
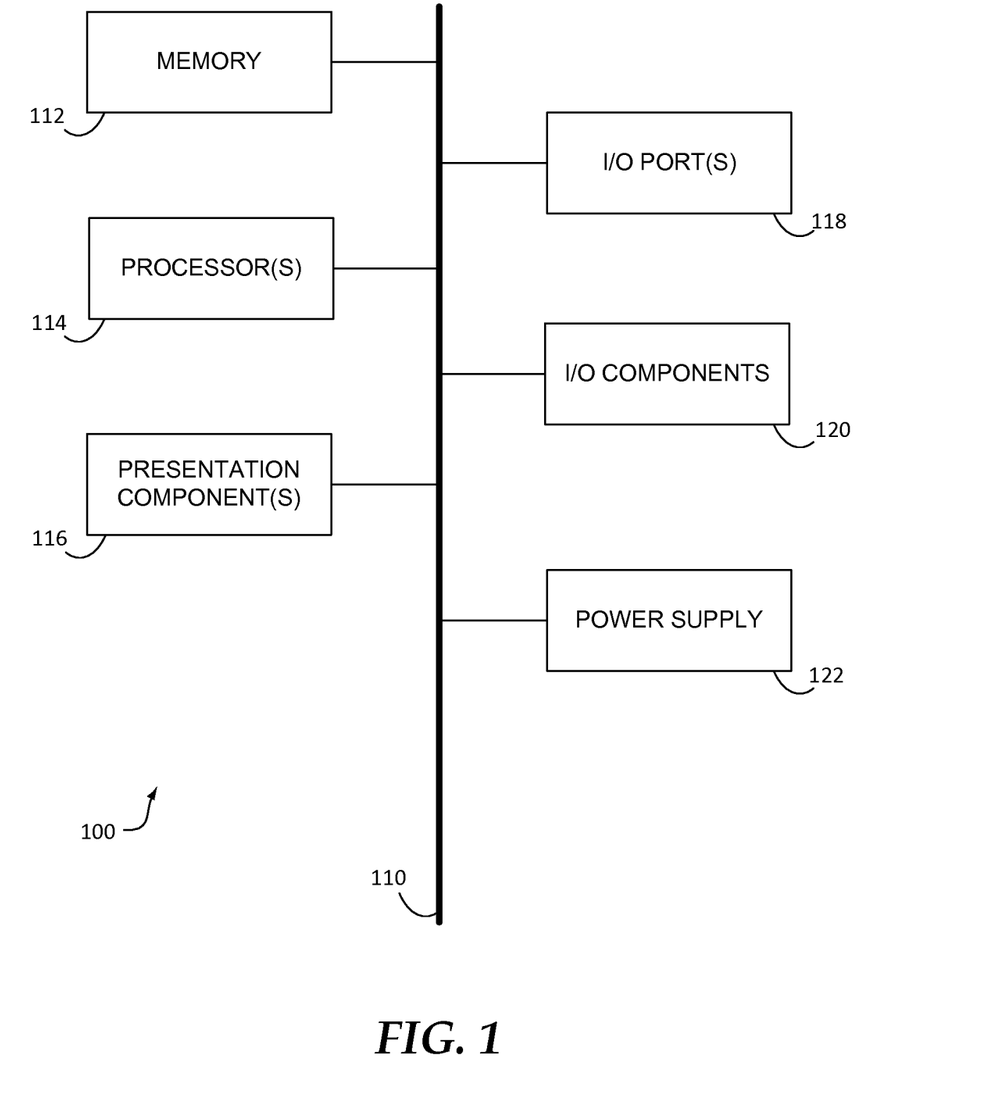
FIGS. 1 and 2 each depict a respective exemplary computing environment.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention might be practiced in a variety of system configurations, including hand-held devices, consumer electronics, general-purpose computers, more specialty computing devices, etc. Embodiments of the invention might also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what might be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one might consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media includes volatile and nonvolatile, non-transitory, removable and non-removable media, implemented in any method or technology for storage of information such as computer-readable instructions, data structures, program modules or other data. Computer storage media includes RAM; ROM; EEPROM; flash memory or other memory technology; CD-ROM; digital versatile disks (DVD) or other optical disk storage; magnetic cassettes, magnetic tape, and magnetic disk storage or other magnetic storage devices, each of which can be used to store the desired information and which can be accessed by computing device 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 112 includes computer-storage media in the form of volatile and/or nonvolatile memory. The memory might be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which might be built in. Illustrative components include a microphone, joystick, game pad, satellite dish, scanner, printer, wireless device, etc.

Figure 2:
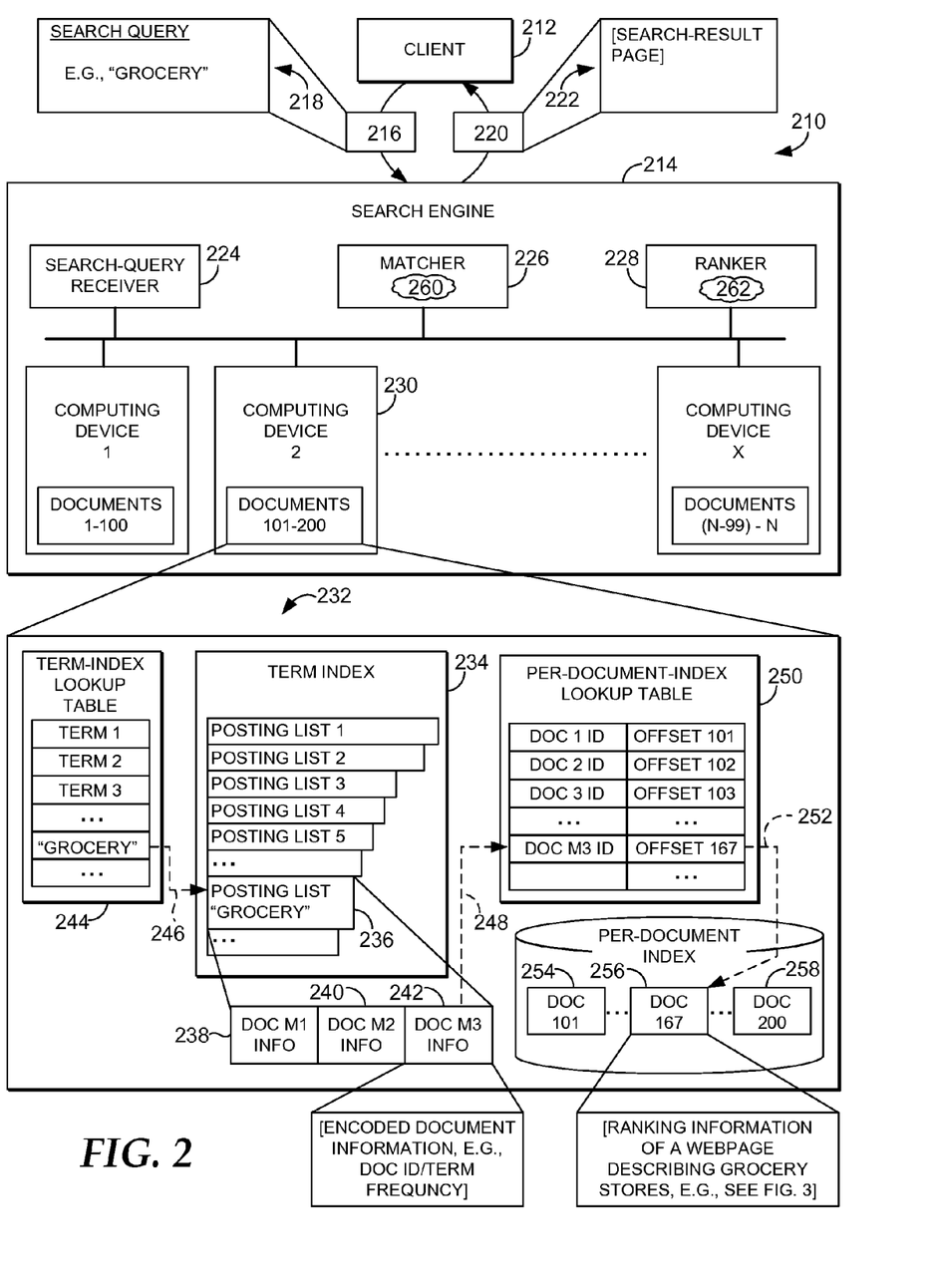

Referring now to FIG. 2, another exemplary computing environment 210 is depicted. Environment 210 includes a client computing device 212 that is exchanging information with a search engine 214, such as via a network (e.g., the Internet). For example, client 212 sends information 216 to search engine 214. Information 216 is depicted in an exploded view 218, which depicts that information 216 includes a search query. An exemplary search query includes the search term "grocery." Environment 210 also depicts that search engine 214 sends information 220 to client 212, and information 220 is depicted in an exploded view 222. Exploded view 222 indicates that information 220 includes a search-results webpage, such as a list of web pages that have been deemed relevant to the search query included in information 216. The exemplary search term "grocery" will be used throughout this description in various explanations.

Search engine 214 includes various components that communicate with one another and that enable search engine 214 to deem documents relevant to a search query. For example, search engine 214 includes a plurality of computing devices (i.e., computing device 1, computing device 2 . . . computing device X), each of which processes a respective set of documents. FIG. 2 depicts that computing device 1 processes documents 1-100, computing device 2 processes documents 101-200, etc. Components of search engine 214 work together to determine which of documents 1-N are relevant to a received search query. For example, search engine 214 includes a search-query receiver 224, which receives search queries that are sent to search engine 214. Search engine 214 also includes a matcher 226 and a ranker 228.

Matcher 226 identifies a number of documents that are matches to a search query or search term. A "match" is typically determined by the application of a matching algorithm, which takes into account various factors when determining whether a document is a match to a search query. For example, a matching algorithm might take into consideration a number of times a search term appears among content of a document when determining whether the document is a match. Matcher 226 might identify all documents stored on each computing device (i.e., computing devices 1 through X) that include a search term. Alternatively, a match threshold might be established, such that matcher 226 identifies a number of matching documents that does not exceed the match threshold. For example, if a match threshold is five documents, then matcher 226 identifies the top five documents on each computing device that match a search query. While matcher might engage in some estimated-ranking activities, or pre-ranking activities, matcher 226 might not assign any final search-result rankings among those identified matching documents.

Ranker 228 receives an identification of the documents that are deemed matches by matcher 226 and ranks those matching documents among one another. For example, if ranker 228 receives an identification of the top matching documents (e.g., top five documents that are matches), ranker 228 applies a ranking algorithm to determine a respective ranking of each of the top matching documents. A ranking algorithm can take various factors into account, some of which might also be taken into account by matcher 226 and others of which are only evaluated by ranker 228.

As indicated, matcher 226 and ranker 228 do not necessarily review the full content of each document when applying the matching algorithm or the ranking algorithm. Rather, search engine 214 includes indexes of information, which contain only select information that is extracted from each of the documents. The indexes represent condensed versions of the searchable documents and are typically more efficient to analyze, such as with the matching algorithm and the ranking algorithm, than the full text of the documents.

Search engine 214 includes computing device 2 (identified by reference numeral 230), which processes documents 101-200 when serving a search query. For example, computing device 2 determines which of documents 101-200 are deemed relevant to the search query "grocery." Documents 101-200 are depicted in an exploded view 232, which illustrates various information structures that are used to organize and summarize documents 101-200.

One information structure used to organize documents 101-200 includes a term index 234. Term index 234 is an inverted index including searchable terms found among content of documents 101-200. Term index 234 includes a set of term postings (e.g., "posting list 1," "posting list 2," etc.), each of which includes information related to a respective term. The postings might be arranged in various orders, such as alphabetically or by term popularity. FIG. 2 depicts that posting 236 includes information that is relevant to the search term "grocery."

Typically, each term posting includes information that is used to determine whether a document is relevant to (i.e., is a match to) a search query. For example, term posting 236 includes three information sets (i.e., identified by reference numerals 238, 240, and 242), each of which includes information related to a respective document (e.g., webpage) that includes the term "grocery." Contrary to many term indexes, term index 234 omits certain categories of information, such as position information that indicates locations within each document at which a term can be found. For example, information set 242 does not include any information that would indicate where among document M3 the term "grocery" is found. By omitting certain categories of information, term index 234 is smaller, thereby reducing computing costs associated with matching a search term. Although term posting 236 omits certain categories of information (e.g., position information) that are used by ranker 228 when applying a ranking algorithm, term posting 236 includes other categories of information that are used in a matching algorithm to identify top document matches, such as term frequency (i.e., the number of times a term is found in a document).

FIG. 2 depicts that information set 242 includes information that is relevant to document M3, which includes the term "grocery." For example, information set 242 includes the label "Doc M3 Info," which indicates that information 242 includes information related to Doc M3. Information set 242 is encoded in a manner that balances a desire to limit memory utilization with an objective of reducing CPU usage required to decode information set 242. For example, a document identifier used to identify Doc M3 is interleaved with a term frequency of "grocery." Although term frequency is described herein for explanatory purposes, other information might also (or alternatively) be encoded with the document identifier that is useful to determine whether a document is a match for a query term.

In one embodiment, the document identifier might be a delta encoded variable integer, whereas the term frequency is a variable integer. Accordingly, exemplary information might take the following forms when maintained in term index 234:

Decoded version [UInt64]+: D1, TF1, D2, TF2, D3, TF3, . . .
Encoded version [UInt64]+: D1, TF1, D2–D1, TF2, D3–D2, TF3, . . .

An alternative encoding mechanism in which the document identifier is interleaved with the term frequency takes into consideration the fact that many term frequencies are below a threshold (e.g., 3). Accordingly, a quantity of bits is reserved to store the encoded document information (i.e., the document identifier and the term frequency). Under this encoding mechanism, when the term frequency is less than a frequency-value threshold (e.g., 3), the quantity of bits is used to encode the term frequency and additional bytes are not used to encode a frequency field. In addition, pursuant to this mechanism, when the term frequency exceeds the frequency-value threshold, additional bytes are used to encode the frequency field. Such an encoding mechanism might allow for a better compression ratio, in exchange for reduced decoding performance. Accordingly, exemplary information might take the following forms when maintained in term index 234 and when a TF field is fixed at 2 bits:

Decoded Information [UInt64]+: D1, TF1, D2, TF2, D3, TF3, . . .
Encoded information [UInt64]+: D1, D2–D1, TF2Exception, D3–D2, . . .
  wherein, the decoding logic is:
    If (TF<=3) then
      use 2 bits for TF, no addition TF field
    Else
      2 bits="00", with addition TF field
      TF=value of addition TF field+3

In a further embodiment, blocks might be used to contain a group of occurrences in a posting. For example, a block might be used to contain information sets 238, 240, and 242. In such an embodiment, a value (N) of LSB bits is selected so that most term frequencies in the block are within 2^N−1, and the other term frequencies are appended in an exception list to the beginning or end of the block. In each group, doc indexes are first encoded into VarInt, and then, term frequencies are encoded (2 bits per term frequency) with exceptions.

Based on the encoding mechanisms and omission of ranking information, term index 234 includes a smaller total size, relative to other indexes that include ranking information or use alternative encoding mechanisms. This smaller size allows more documents to be fit into a memory component (e.g., SSD, HDD, etc.) and reduces CPU costs incurred when performing matching operations. In one embodiment, the term index is stored and served together in memory and SSD, thereby leveraging index serve optimization. For example, in-memory/in-buffer caching schema can be applied.

FIG. 2 also depicts a term-index lookup table 244, which includes a mapping of the term "grocery" to a specific location in term index 234. The mapping is represented by arrow 246. For example, the mapping 246 might be to a location in memory or SSD, thereby assisting to locate the starting point of the posting 236 for "grocery."

As indicated, information set 242 includes a document identifier that is used to identify information relevant to "Doc M3." For example, arrow 248 depicts that a document identifier can be looked up in a per-document-index lookup table 250, which maps the document identifier to a location in a per-document index 252 at which document-ranking information is maintained.

Per-document index 252 is organized on a per-document basis, such that each per-document index table categorizes information relevant to a specific document. That is, if computing device 2 230 includes documents 101-200, then per-document index 252 includes a per-document index table for each of the documents included in documents 101-200. Boxes 254, 256, and 258 represent information relevant to documents 101, 167, and 200 (respectively). Each per-document index table includes rich information that is used by ranker 218 to determine a rank of a respective document. That is, ranker 218 plugs information pulled from a per-document index table into a ranking algorithm to determine a rank of a document among search results. Examples of document-ranking information include information that might typically be included in the term index (e.g., position information) but that has been omitted from the term index in order to reduce a size of the term index. In addition, each per-document index table might include information (e.g., a copy of the document itself) that is used to generate a caption or snippet, which is used to represent a document in a search-result list.

Figure 3:
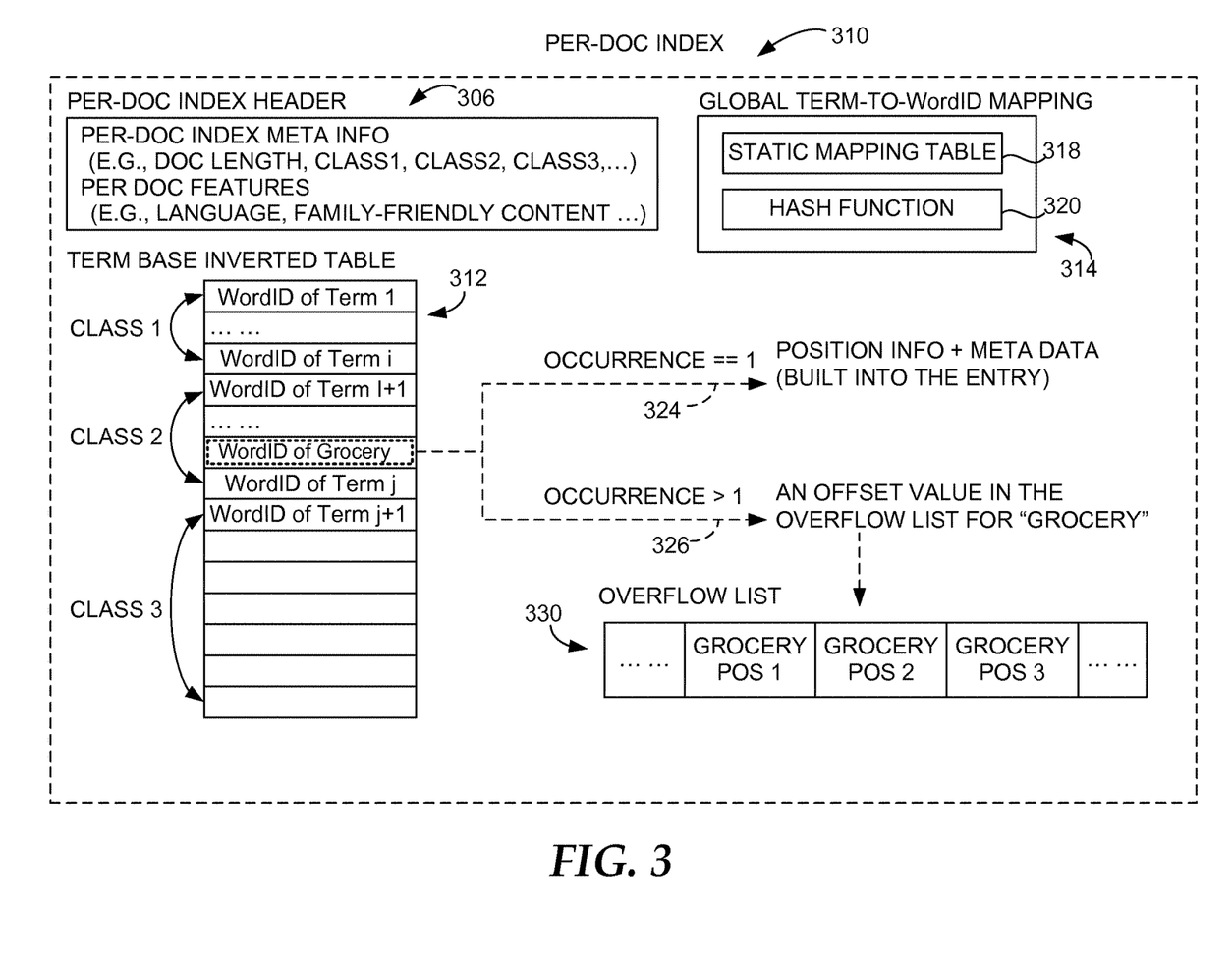
FIG. 3 depicts an example of information categorized in a per-document index.

Referring now to FIG. 3, exemplary information from a per-document index 310 is depicted. That is, the information depicted in FIG. 3 represents information that might be included in a per-document index table of a particular document. FIG. 3 depicts that information of a particular document includes an index header 306, a mapping 314, and a term index 312.

An exemplary index header 306 includes current document data (e.g., static rank, length, etc.). In addition, header 306 might include information describing a number of term classes (e.g., Classes 1, 2, and 3) included in a document, as well as other document features, such as language.

Information included in a per-document index also includes an identification of all searchable terms that are included among content of a document. These terms are encoded using a global term-to-WordID mapping 314. FIG. 3 indicates that mapping 314 includes a static mapping table 318, which is used to map popular terms to a 1 or 2 byte integer. In addition, mapping 314 includes a hash function 320 to map less-popular terms to an 8-byte hash value. Using mapping 314, all terms in term index 312 are not stored in an original text format, thereby saving space. More specifically, each term included in term index 312 is mapped to a WordID (e.g., integer). In term index 312, the WordID is stored, as opposed to the term. Accordingly, when looking up a term (e.g., grocery) in the inverted term index 312, the term is first looked up in the mapping to identify the WordID, and the WordID is then referenced in term index 312.

As indicated, the WordID might include one of two variations: fixed mapping (from 318) or hash mapping (from 320). Generally, popular terms receive a WordID that is generated using a fixed mapping approach, such that each term maps to a pre-defined number in a space of $[0 \ldots 2^k-1]$. Based on a popularity of the term, either 1 or 2 bytes are used to create a respective WordID. To facilitate quicker search, the mapping might be built into the memory associated with the per-document index. In an exemplary embodiment, the top 255 frequently occurring terms are represented using a 1 byte WordID, and these frequently occurring terms are categorized in term index 312 as Class 1. The next top-64K terms are identified in term index 312 as class 2 terms and are represented by a 2 byte ID. The mapping of terms to WordID of both Class 1 and Class 2 terms might be stored explicitly in memory, using e.g. a hash mapping scheme. Based on these exemplary sizes, and assuming the average term text length is 25 bytes, this mapping table will use approximately 1.6 M bytes of memory.

In a further example, less popular terms are represented by 6 or 8 byte WordIDs (from 320) and are identified in term index 312 as Class 3. For each term in Class 3, the WordID is a hash value of the term text. Assuming a document with an average of 1000 unique terms, the probability of two terms in the document can collide is $C(2, 1000)/2^{64}=1/2^{45}$. For 10B doc corpus, the total number of documents with word collisions is roughly $10B/2^{45}=0.0003$.

Term index 312 is an inverted term index 312, which lists Word IDs of searchable terms that are included among content of the document. Each term posting includes information that is relevant to that respective term as it relates to the document. For example, the highest bit of the posting entry indicates whether there are more than one posting for that term (i.e., whether or not that term is found among content of the document more than once). If the term is only found among content of the document one time, then the posting position is stored in the lower bits of the entry. This scenario is depicted by arrow 324. However, if the term is found among content of the document more than once, then the lower bits of the entry contain a pointer to an overflow array 330 of the posting list. This scenario is depicted by arrow 326.

Overflow array 330 stores the extra posting locations for terms with more than one location among content of a document. The highest bit of each entry is the continuation bit to denote whether the next entry belongs to the current term. If it is 0, then the current entry is the last entry in the term's posting list. Each position entry uses a fixed number of bytes to store the position information, and the size is depending on the total size of the document.

Referring back to FIG. 2, ranker 228 pulls information from per-document indexes to be analyzed with a ranking algorithm. For example, once document matches have been identified by matcher 226, ranker 228 retrieves information from the respective per-document index of each of the document matches and determines respective ranks among the document matches. In one embodiment, per-document index tables are stored in solid-state memory, thereby leveraging I/O performance capabilities. For example, per-document index information of matching documents (i.e., documents that are identified as matches by matcher 226) can be loaded on demand.

By applying a multi-layer index approach, as described above, multiple queries can be served in parallel. For example, when processing of a first query proceeds from matcher 226 to ranker 228, matching processing of a second query on the same computing device can begin, even though the first query is still being processed by ranker 228. In addition, serving term index 234 and per-document index 304 in SSD allows search engine 214 to leverage performance capabilities of the SSD for more efficient query serving.

Figure 4:
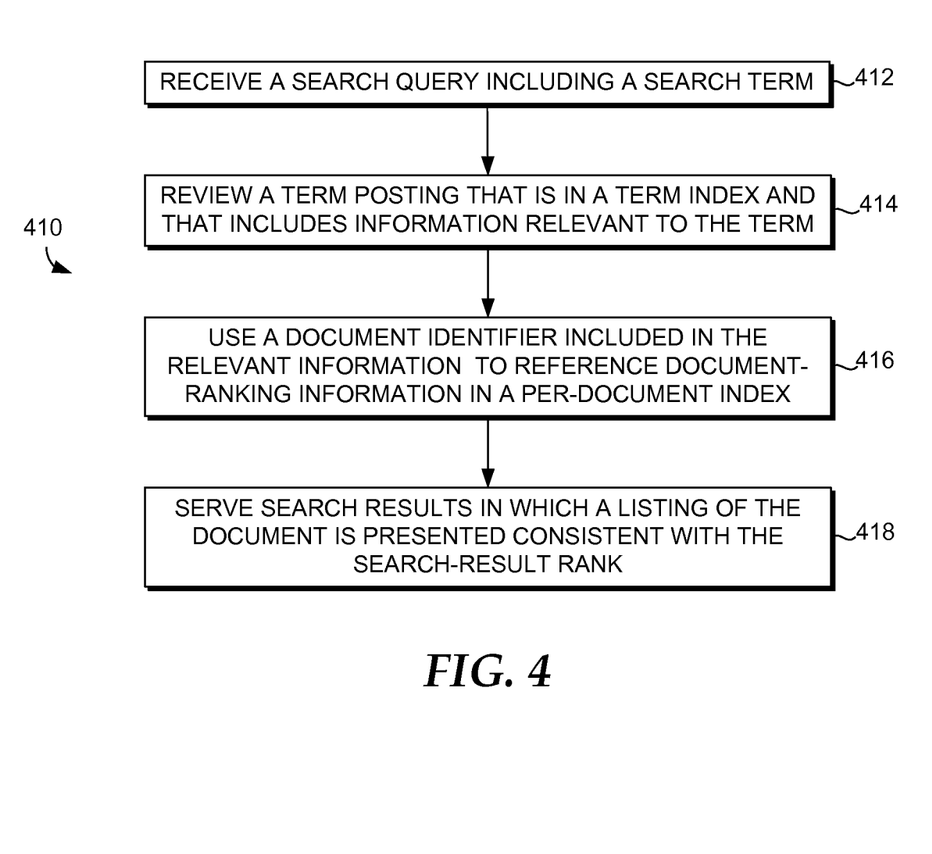
FIGS. 4 and 5 include flow diagrams that depict respective methods.

Referring now to FIG. 4, a flow diagram depicts a series of steps that facilitates a method 410 of deeming that a document is relevant to a search query. When describing FIG. 4, reference might also be made to FIGS. 2 and 3 for explanatory purposes. In one embodiment, computer-storage media include computer-executable instructions embodied thereon that, when executed, perform the steps identified in FIG. 4. For example, one or more applications that are identified by references numerals 260 and 262 and are executed by the matcher and ranker, respectively. When applications 260 and 262 are executed, the steps of method 410 are carried out.

Method 410 includes at step 412 receiving by a search engine a search query including a search term. For example, as already described, search-query receiver 224 receives a search query including "grocery" as a search term. Search engine 214 includes term index 234 having multiple postings, and posting 236 includes information relevant to the search term "grocery."

Step 414 includes reviewing a term posting having information relevant to the search term, wherein the information relevant to the search term includes a document identifier of the document, which includes the search term. For example, posting 236 is reviewed that includes a document identifier of "Doc M3," which includes the term "grocery" among its contents.

At step 416, the document identifier is used to reference document-ranking information in a per-document index, wherein the document-ranking information is used to assign a search-result rank to the document. For example, arrow 248 represents a document identifier being used to reference document-ranking information. As described above, a document identifier is mapped in lookup table 250 to a location of the document-ranking information in the per-document index.

Pursuant to step 418, search results are served in which a listing of the document is presented consistent with the search-result rank. For example, information 220 is provided to client 212 that includes a search-results webpage. The search-results webpage is generated based on ranking information determined by ranker 228.

Method 410 describes steps for serving a search query. When using a multi-layer search-engine index, as described herein, a query-serving flow can remain similar to that flow that is used with a single index, such as by moving from document matching to ranking estimates to final rankings. However, when the search engine leverages the separate indexes and input/output performance capabilities of the solid-state drive, query-serving performance can be enhanced, such as by executing multiple search queries in parallel.

Figure 5:
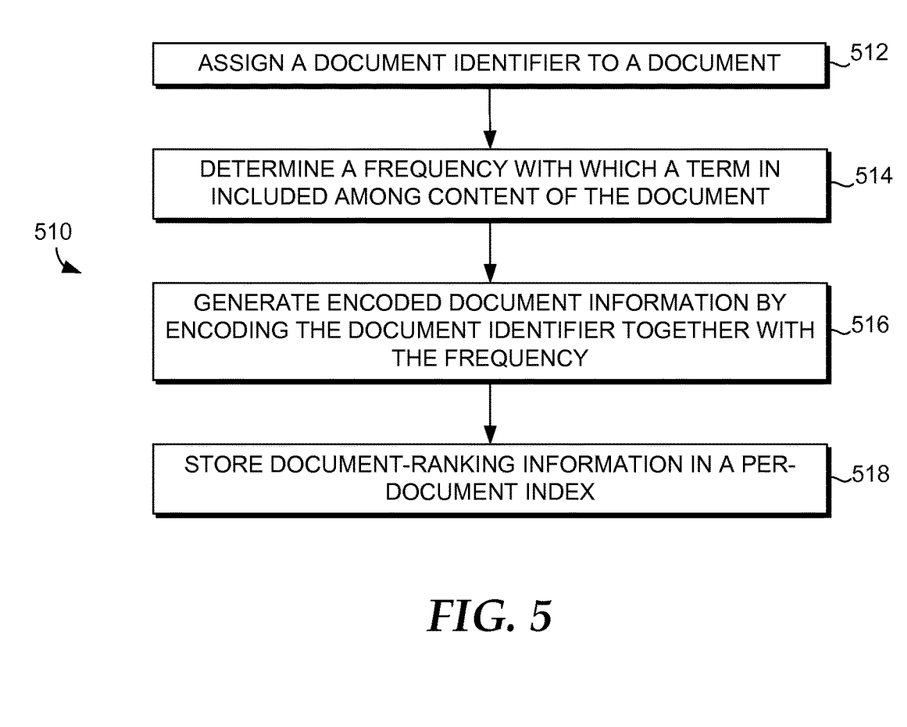

Referring now to FIG. 5, another flow diagram depicts a series of steps that facilitates a method 510 of indexing a document (e.g., document 167 described by information set 256) in a search-engine index to allow a search engine to assess a relevance of the document to a search query (e.g., "grocery"). When describing FIG. 5, reference might also be made to FIGS. 2 and 3 for explanatory purposes. In one embodiment, computer-storage media include computer-executable instructions embodied thereon that, when executed, perform the steps identified in FIG. 5.

Method 510 includes at step 512 assigning a document identifier to the document. For example, when Doc M3 of FIG. 2 is being processes, a document identifier is assigned to Doc M3 and is stored in per-document-index lookup table. Step 514 includes determining a frequency with which a term is included among content of the document. For example, the number of times the term "grocery" is included in Doc M3 is calculated. As already describe, the search-engine index comprises a term index 234, which includes a term posting 236 having information relevant to the term (i.e., "grocery").

Pursuant to step 516, the document identifier is encoded together with the frequency to generate encoded document information. The term posting is transformed to include the encoded document information. In addition, step 518 includes storing a set of document-ranking information in a per-document index (separate from the term index). The document-ranking information is used to rank the document when processing the search query. For example, term posting 236 would be updated to include encoded document information in information set 242. Likewise, the per-document index table included in information 256 would store document-ranking information pulled from Doc M3.

The foregoing has described a system of components that is usable to index documents and to service a search-engine query. For example, the system depicted in FIGS. 2 and 3 includes multiple indexes (e.g., term index 234 and per-document index 310) that organize respective sets of information, which are made available to matcher 226, ranker 228, and other search-engine components. In addition, methods have been described that can be executed using the search-engine components described above, such as a method for servicing a search query and a method for indexing a document.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of indexing a document in a search-engine index to allow a search engine to assess a relevance of the document to a search query, the method comprising:
   assigning a document identifier to the document;
   determining a frequency with which a term is included among content of the document, wherein the search-engine index comprises a term index, which includes a term posting having information relevant to the term;
   encoding the document identifier together with the frequency to generate encoded document information, wherein the term posting is transformed to include the encoded document information; and
   storing a set of document-ranking information in a per-document index, which is separate from the term index, wherein the document-ranking information is used to rank the document when processing the search query.

2. The method of claim 1, wherein, when encoded, the document identifier and the frequency are interleaving.

3. The method of claim 2, wherein, when encoded, the document identifier is a delta-encoded variable integer and the frequency is a variable integer.

4. The method of claim 2,
   wherein a quantity of bits is reserved to store the encoded document information,
   wherein, when the frequency is less than a frequency-value threshold, the quantity of bits is used to encode the term frequency and additional bytes are not used to encode a frequency field, and
   wherein, when the frequency exceeds the frequency-value threshold, additional bytes are used to encode the frequency field.

5. The method of claim 1, wherein in the term posting a group of occurrences is contained in a block.

6. The method of claim 1,
   wherein the set of document-ranking information includes a list of searchable terms that are included among content of the document, and
   wherein each searchable term included on the list of searchable terms is encoded by assigning each searchable term a respective pre-determined global term identifier, which is used to identify each searchable term throughout the per-document index.

7. The method of claim 6, wherein the list of searchable terms is organized in a document-specific inverted table that includes a list of global term identifiers, each of which is mapped to a respective searchable term.

8. The method of claim 7, wherein each posting in the document-specific inverted table includes occurrence data, which indicates a number of times the respective searchable term occurs in the document.

9. The method of claim 8, wherein, when the number of times is greater than a threshold, the occurrence data is maintained in an overflow list.

10. A system for indexing a document in a search-engine index, the system comprising:
- a hardware processor and a memory configured for providing computer program instructions to the processor;
- a search engine configured to:
- assign a document identifier to the document;
- determine a frequency with which a term is included among content of the document, wherein the search-engine index comprises a term index, which includes a term posting having information relevant to the term;
- encode the document identifier together with the frequency to generate encoded document information, wherein the term posting is transformed to include the encoded document information; and
- store a set of document-ranking information in a per-document index, which is separate from the term index, wherein the document-ranking information is used to rank the document when processing a search query.

11. The system of claim 10, wherein, when encoded, the document identifier and the frequency are interleaving.

12. The system of claim 11, wherein, when encoded, the document identifier is a delta-encoded variable integer and the frequency is a variable integer.

13. The system of claim 11,
- wherein a quantity of bits is reserved to store the encoded document information,
- wherein, when the frequency is less than a frequency-value threshold, the quantity of bits is used to encode the term frequency and additional bytes are not used to encode a frequency field, and
- wherein, when the frequency exceeds the frequency-value threshold, additional bytes are used to encode the frequency field.

14. The system of claim 10, wherein in the term posting a group of occurrences is contained in a block.

15. The system of claim 10,
- wherein the set of document-ranking information includes a list of searchable terms that are included among content of the document, and
- wherein each searchable term included on the list of searchable terms is encoded by assigning each searchable term a respective pre-determined global term identifier, which is used to identify each searchable term throughout the per-document index.

16. The system of claim 15, wherein the list of searchable terms is organized in a document-specific inverted table that includes a list of global term identifiers, each of which is mapped to a respective searchable term.

17. The system of claim 16, wherein each posting in the document-specific inverted table includes occurrence data, which indicates a number of times the respective searchable term occurs in the document.

18. The system of claim 17, wherein, when the number of times is greater than a threshold, the occurrence data is maintained in an overflow list.

19. A system that includes a processor coupled with a computer storage device and that indexes a document in a search-engine index, the system comprising:
- a term index maintained as part of the search-engine index, the term index including a plurality of term postings each of which stores information relevant to a respective term,
- wherein the information relevant to the respective term includes a document identifier that identifies a document that includes the respective term and a frequency with which the term is included among content of the document, and
- wherein the document identifier is encoded together with the frequency when stored in the term index, such that the document identifier and the frequency are interleaving; and
- a per-document index that stores a set of document-ranking information and that is separate from the term index, wherein the document-ranking information is used to rank the respective document when processing a search query.

20. The system of claim 19,
- wherein the set of document-ranking information includes a list of searchable terms that are included among content of the document and are organized in a document-specific inverted table including a list of global term identifiers, each of which is mapped to a respective searchable term,
- wherein each posting in the document-specific inverted table includes occurrence data, which indicates a number of times the respective searchable term occurs in the document, and
- wherein, when the number of times is greater than a threshold, the occurrence data is maintained in an overflow list.

* * * * *